United States Patent
Haustein et al.

(10) Patent No.: US 9,130,648 B2
(45) Date of Patent: Sep. 8, 2015

(54) METHOD OF AND RADIO NETWORK FOR TRANSMITTING LAYERED DATA TO MULTIPLE RECEIVING STATIONS

(75) Inventors: Thomas Haustein, Potsdam (DE); Venkatkumar Venkatasubramanian, Berlin (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 1081 days.

(21) Appl. No.: 12/610,862

(22) Filed: Nov. 2, 2009

(65) Prior Publication Data

US 2010/0120360 A1 May 13, 2010

(30) Foreign Application Priority Data

Oct. 31, 2008 (EP) .................................... 08105713

(51) Int. Cl.
| | | |
|---|---|---|
| *H04W 40/22* | (2009.01) | |
| *H04B 7/26* | (2006.01) | |
| *H04H 20/22* | (2008.01) | |
| *H04L 27/34* | (2006.01) | |
| *H04H 20/02* | (2008.01) | |
| *H04H 60/11* | (2008.01) | |
| *H04L 5/00* | (2006.01) | |
| *H04L 27/26* | (2006.01) | |

(52) U.S. Cl.
CPC .............. *H04B 7/2606* (2013.01); *H04H 20/22* (2013.01); *H04L 27/3488* (2013.01); *H04H 20/02* (2013.01); *H04H 60/11* (2013.01); *H04L 5/0023* (2013.01); *H04L 27/2604* (2013.01)

(58) Field of Classification Search
USPC ................. 370/226, 243, 246, 274, 279, 293, 370/310.2, 315, 327–339, 349, 406, 492, 370/501; 455/8–10, 11.1, 12.1, 13.1, 13.2, 455/13.3, 13.4, 14–25, 422.1
See application file for complete search history.

(56) References Cited

U.S. PATENT DOCUMENTS

| | | | |
|---|---|---|---|
| 2006/0239365 A1 | 10/2006 | Smallcomb et al. | |
| 2007/0201392 A1* | 8/2007 | Ramachandran | 370/315 |
| 2008/0025323 A1 | 1/2008 | Khan | |
| 2008/0045147 A1* | 2/2008 | Okuda | 455/15 |
| 2008/0130549 A1* | 6/2008 | Chindapol et al. | 370/315 |
| 2009/0016232 A1* | 1/2009 | Kwon et al. | 370/252 |
| 2009/0052394 A1* | 2/2009 | Kalhan | 370/331 |
| 2010/0195482 A1* | 8/2010 | Walker et al. | 370/208 |
| 2011/0173517 A1* | 7/2011 | Kim | 714/776 |

FOREIGN PATENT DOCUMENTS

| | | |
|---|---|---|
| WO | 2006/066607 A1 | 6/2006 |
| WO | 2008/037811 A1 | 4/2008 |

OTHER PUBLICATIONS

Luo, Hierarchical Modulation for the Downlink of MIMO Multi-User Channels, 2005, IEEE, p. 77-80.*

* cited by examiner

*Primary Examiner* — Hoon J Chung

(57) ABSTRACT

A radio network with at least one sending station, at least one relay station and at least a first and a second receiving station transmits data organized in at least a first and a second layer, where at least the first layer is routed via a first path from the base station to the relay station to a first receiving station and at least the second layer is routed to the second receiving station via a different second path.

13 Claims, 2 Drawing Sheets

METHOD OF AND RADIO NETWORK FOR TRANSMITTING LAYERED DATA TO MULTIPLE RECEIVING STATIONS

CROSS REFERENCE TO RELATED APPLICATIONS

This application is based on and hereby claims priority to European Application No. 08105713 filed on Oct. 31, 2008, the contents of which are hereby incorporated by reference.

BACKGROUND

Described below is a method of transmitting data in a radio network with at least one sending station, at least one relay station and at least a first and a second receiving station, which data is organized in at least a first and a second layer. Furthermore, described below is a radio network having at least one sending station and at least one relay station, the radio network being designed to transmit data, which is organized in at least a first and a second layer, to at least a first and a second receiving station.

In modern telecommunication networks, high data rates are required to satisfy the demand of present-day applications. High data rates are achieved with high signal to noise ratios (SNR) in order to provide satisfactory bit error rates (BER). As the output power of sending stations normally is limited, relay stations are provided in some networks for this reason, which receive the data sent by the sending station and re-sent the data with a signal level higher than the level of the received signals. Relay assisted communication is a promising approach to enhance the throughput in cellular systems such as 3GPP-LTE or Wimax. This increase in throughput is achieved by decreasing the path loss attenuation of the shadowed users by use of a relay. The decrease in path loss improves the signal power distribution in the cell, and in turn increases the possible throughput. (3GPP LTE—Long Term Evolution—is the name given to a project within the Third Generation Partnership Project to improve the UMTS mobile phone standard to cope with future technology evolutions. WiMAX, the Worldwide Interoperability for Microwave Access, is a telecommunications technology that provides for the wireless transmission of data in a variety of ways, ranging from point-to-point links to full mobile cellular-type access.)

In addition, more sophisticated methods to improve the data transmission exist in modern networks, such as multiple antenna systems combined with OFDM technology. One such example is improving the cell coverage area while maintaining good spectral efficiency. In MIMO-OFDM (MIMO=Multiple Input Multiple Output, OFDM=Orthogonal Frequency Division Multiplexing) spectrally efficient coverage enhancement is achieved by frequency dependent link adaptation and scheduling. In spite of the advancements made, the average achieved spectral efficiency becomes limited by the user distribution in the cell. For instance, high demand from users with bad channel conditions can cause problems in the spectrum. Such users with bad channel conditions could be for instance located in cell edge, deep shadowed areas or even indoors.

Recently, US 2008/0025323 Al has been published, which is related to this topic and discloses a system and method for a multi-layer multi-hop wireless system. In one example, the method includes dividing information to be sent from a source node to a destination node via a relay node into at least first and second segments. A signal containing the first and second segments is generated for transmission from the source node, where the first and second segments are encoded differently within the signal. The signal containing the first and second segments is sent from the source node to the relay node and the destination node. Only the first segment is recovered from the signal by the destination node, while the first and second segments are recovered by the relay node. The second segment is sent by the relay node to the destination node, which combines the first and second segments to reconstruct the information. The information may be organized in different layers, in particular layers with different priorities.

SUMMARY

One drawback of the proposed solution is that it is related to just one receiving station which considerably limits its applications. Accordingly, an aspect is to provide a method and a radio network which provide for data transmission to a plurality of receiving stations in a multi-layer multi-hop wireless system.

Accordingly, a method of transmitting data in a radio network with at least one sending station, at least one relay station and at least a first and a second receiving station is disclosed, wherein data is organized in at least a first and a second layer, wherein at least the first layer is routed via a first path from the base station to the relay station to a first receiving station and wherein at least the second layer is routed to the second receiving station via a different second path.

Accordingly, also a radio network is disclosed having at least one sending station and at least one relay station designed to transmit data, which is organized in at least a first and a second layer, to at least a first and a second receiving station, wherein at least the first layer is routed via a first path from the base station to the relay station to a first receiving station and wherein at least the second layer is routed to the second receiving station via a different second path.

The method, which may also be seen as "relay-enhanced space-division multiple access," advantageously provides for multi-user diversity in two layers. One layer (e.g. the outer layer), including the spatial stream multiplexing mode, supports multiple stream transmission to several users from the base station. The other layer (e.g. the inner layer) includes constellation multiplexing which is embedded within each spatial stream from the base station. The role of relays is to enable the usage of the inner constellation multiplexing layer by re-routing information to a plurality of receiver nodes.

It is advantageous if the second path is from the base station to the relay station to the second receiving station. In this embodiment, the data for the second receiving station is amplified or re-generated in the relay station so that the second receiving station can receive data even under bad conditions.

It is also advantageous if the second path is from the base station directly to the second receiving station. This embodiment provides for a relatively low traffic load on the relay station as the second path is directly from the base station to the second receiving station. Accordingly, the relay station can fulfill its function with less technical equipment.

Furthermore it is beneficial, if the layers have different priorities. Here data is split in a high priority part, often providing contents just at a relatively low quality level, and a low priority part, often providing contents at a relatively high quality level.

Finally, it is beneficial if the data are a video stream. This embodiment may be used in broadcast systems such as terrestrial Digital Video Broadcasting (DVB-T) systems, which have a high priority stream and a low priority stream. Users with poor channel conditions can only receive the high priority stream and thus receive the broadcast at a relatively low quality. By contrast, users with good channel quality can decode also the low priority stream and receive the broadcast at a relatively good quality. Users with good channel quality may decode the signal as a higher order constellation such as 16-QAM for example, while users with poor channel quality decode the signal as a QPSK constellation for example. In this example, the data rate for users who decode the signal as 16-QAM (four bits/symbol) is twice as large as the data rate for users decoding the signal as a QPSK constellation (two bits/symbol).

It is advantageous if a unicast report for a channel quality indicator with hierarchical modulation is used. The channel quality indicator report (CQI) is an advantageous base for various relaying modes.

It is beneficial, if the at least one sending station signals to the at least one relay station and the at least first and second receiving station via a control channel in which time slot of a multitude of timeslots a receiving station is scheduled. A priori it is not clear in which time slot a receiving station is scheduled. So, the proposed embodiment may favorably be used to overcome this deficiency.

In this context it is also beneficial if the signaling information additionally contains information about receiving station scheduled on the hierarchically constellation multiplexed symbol per spatial multiplexing stream. Here, the signaling information is also used to send additional information which is why the signaling information provides a double function.

In this context it is furthermore beneficial if the signaling information additionally contains information about the modulation and coding scheme format for the corresponding receiving station. Here again, the signaling information provides a double function in a favorable way.

In an advantageous embodiment, the at least one sending station and the at least one relay station transmit simultaneously to receiving station within and outside a relay cluster. In this way the spectrum can be shared in a favorably manner.

In yet another advantageous embodiment, the at least one sending station and the at least one relay station transmit simultaneously to the receiving station within a relay cluster. This is another favorably way to share the spectrum.

Furthermore, it is advantageous if antenna selection is jointly performed in the at least one sending station and the at least one relay station. This is yet another favorably way to share the spectrum.

It is also advantageous if the at least one sending station and the at least one relay station use concatenated coding, iterative decoding or interference cancellation. Again, the spectrum can be shared in a favorably way.

Finally, it is advantageous if data re-transmissions of the at least one relay station are used for interference mitigation with linear or non-linear operations. This is a favorably way to mitigate interferences in the network.

It should be noted that the embodiments and advantages which have been disclosed for the method mutatis mutandis apply to the radio network and the receiving station and vice versa.

The radio network, the relay station and the receiving stations may implement the method utilizing software and/or hardware.

The embodiments described hereinbefore can be combined in any desired way.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein the same elements and elements with the same function are referenced with the same reference sign if not stated otherwise.

Figure 1:
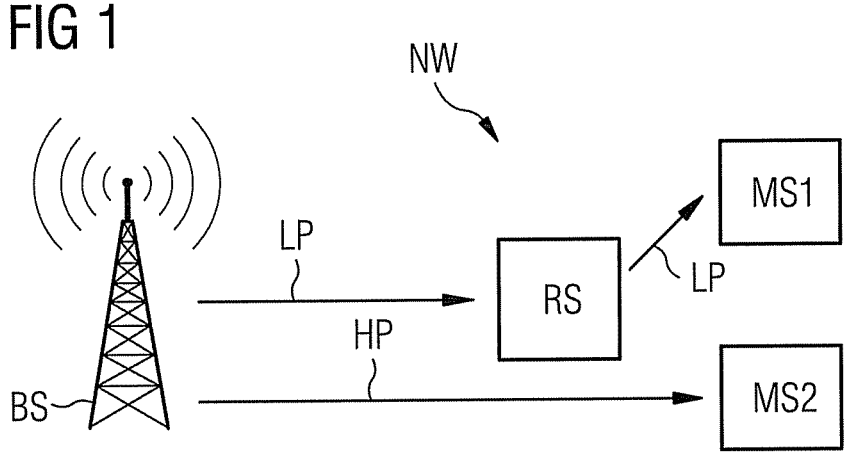
FIG. 1 is a block diagram of a first method to transmit data in a network.

FIG. 1 shows a radio network NW, having a base station BS, a relay station RS and a first and a second receiving station MS1, MS2. In this example, data is sent in a high priority layer HP and a low priority layer LP, wherein the low priority layer LP is sent to the relay station RS, repeated by the relay station RS and finally received by the first receiving station MS1. The high priority layer HP is sent by the base station BS as well, but directly to the second receiving station MS2 without the involvement of the relay station RS.

Figure 2:
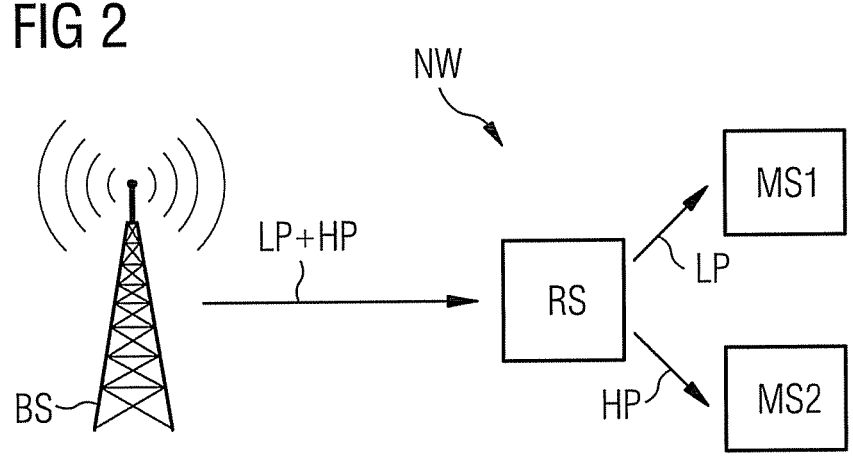
FIG. 2 is a block diagram of a second method to transmit data in a network.

FIG. 2 shows a similar radio network NW, again having a base station BS, a relay station RS and a first and a second receiving station MS1, MS2. In this example, the base station BS sends the high priority layer LP and the low priority layer LP to the relay station RS which repeats the received data. The first receiving station MS1 receives the low priority layer LP whereas the second receiving station MS2 receives the high priority layer HP.

Looking at the first example, there is a multicast transmission from the base stations view and a unicast transmission from the relay stations view. By contrast, there is a unicast transmission from the base stations view whereas there is a multicast transmission from the relay stations view in the second example. However, in both examples there is a multicast transmission between the base station BS and the receiving stations MS1 and MS2.

In this mode, (at least) the first and the second receiving station MS1 and MS2 are paired together for transmission and treated as plurality of destinations. A hierarchical encoding method is used at the base station BS. Two different information streams are multiplexed into a single constellation. High priority layer HP belongs to high priority user and low priority layer LP belongs to low priority user. The priority of the user is determined via a rate a user pays for a particular service for instance (e.g. high monthly flat rate vs. low monthly flat rate). The high priority layer HP is communicated directly to high priority user terminal.

In the following, the bit loading for the communication between base station BS, relay station RS and the receiving stations MS1 and MS2 is explained. The base station BS decides whether hierarchical or conventional encoding shall be performed, based on maximizing the following metric. This is done on MCS level (MCS-EGPRS Modulation and Coding Scheme). For communication links involving N spatial streams by the use of multiple antennas $$L_{TOT} = \sum_{s=1}^{s=N} L^{(s)} \qquad \text{(Equation 1)}$$

where s denotes the spatial stream number and $L_{TOT}$, the weighted sum of transmission spectral efficiencies per resource block (represented as number of bits per transmit symbol) over the hops. Furthermore $$L^{(s)} = \sum_{k=0}^{k=K-1} \frac{1}{\beta_{(k)}} \left( \frac{L_{(k)}^{(s)}}{k+1} \right) \qquad \text{(Equation 2)}$$

where K−1 is the number of relays, k=0 denotes the direct link and $L_{(k)}^{(s)}$ is the number of bits communicated over the resource block using the transmitting terminal k. The weighting factor $\beta_{(k)}$ is introduced for scaling the total network power expended for transferring an information bit. The penalty factor is monotonically increasing with the number of hops k, which is used to re-transmit the information bit. The penalty factor acts as an implicit interference mitigation parameter for the cell. A direct result from this equation is that it is energy-efficient to transmit maximum supportable bits beginning from the ascending order of hop index k.

For simplicity, we consider the case with just one hop as follows as shown in FIGS. 1 and 2 and $L_{max}$=6 bits if 64-QAM is the maximum supportable. If $L_{BS-UE}$, $L^j_{RS-UE}$, $L_{BS-RS}$ are the supportable CQI levels (CQI=Channel Quality Indicator) from the base station BS to the receiving station MS1, MS2, from the relay station RS to the receiving stations MS1, MS2 and from the base station BS to the relay station RS, then the number of re-transmitted bits per resource block by the relay station RS results from Equation 1 and is given by $$L_R = \min((L_{BS-RS} - L_{BS-UE}), L^j_{RS-UE}) \qquad \text{(Equation 3)}$$

where j is an arbitrary resource block index, on which the relay station RS could re-transmit the data to the receiving stations MS1, MS2. Even though the resource block could be selected with a great degree of freedom, it is assumed that the relay station RS uses the same resource block as the base station BS for re-transmission so as to reduce complexity. Therefore, the superscript j is dropped.

Equation 3 is based on the fact that maximum supportable bits are loaded on the direct link and the remaining are transmitted by the relay station RS. However, to do so, maximum supportable bits on the channel between base station BS and relay station RS should be in excess of the direct channel to the receiving stations MS1, MS2.

Relay-Enhanced Space Division Multiple Access:

As previously illustrated in the FIGS. 1 and 2, it is possible to support constellation multiplexing by using hierarchical modulation in multicast mode. This multi-user mode is operated along with spatial stream multiplexing to the users. In other words, each spatially multiplexed stream is also enabled to support constellation multiplexing via the relay station RS.

The bit loading procedure in this case is modified as follows:

1) Allocate resources to high priority bits to a user by maximizing the metric $$\arg\max\left(\frac{1}{u_n} L_{BS-UE(n)}\right)$$

on the direct link from the base station BS. The user selection is performed on each spatial stream. Intuitively, this selection procedure enables SDMA operation (SDMA=Space Division Multiple Access) from the base station BS wherein $u_n$ is the proportional fair weight metric.

2) In this step, another user selection process is implemented for routing hierarchically modulated bits via relay station RS. These users are selected as per the buffer status information. This is done as per $$\arg\max(q_l(n') \min((L_{BS-RS} - L_{BS-UE(n)}), L_{RS-UE(n')})) \qquad \text{(Equation 4)}$$

Here $q_l(n')$ is the transmit buffer size of the layer l for the user n'. High priority layers HP are considered first. This user selection step considers fairness aspects by incorporating both the transmit buffer size. User $n' \in R$, where R is the group of users under the relay station RS.

3) The number of bits transmitted by relay to user n' is $$L^{n'}_R = \min((L_{BS-RS} - L_{BS-UE(n)}), L_{RS-UE(n')})$$

The enhancement of downlink SDMA mode via the relay station RS happens in following way a) The base station BS employs downlink SDMA mode directly to the receiving stations MS1, MS2 (user terminals) independent of the establishment of a relay station RS or irrespective of relay channel conditions. The proportional fair metric is updated after each spatial stream scheduling. The transmit buffer queue size after this resource allocation is updated.

b) Then, it is verified whether the selected users are served under a relay cluster. Other users under this relay cluster are also pre-selected.

c) SDMA operation via the relay station RS is performed with constellation multiplexing each spatial stream so as to piggy-back transmissions to other users in this relay cluster. This step takes the transmit buffer size into account. Intuitively, this technique enables to support higher video quality to user equipments which are under a relay based upon the rate demand.

Figure 3:
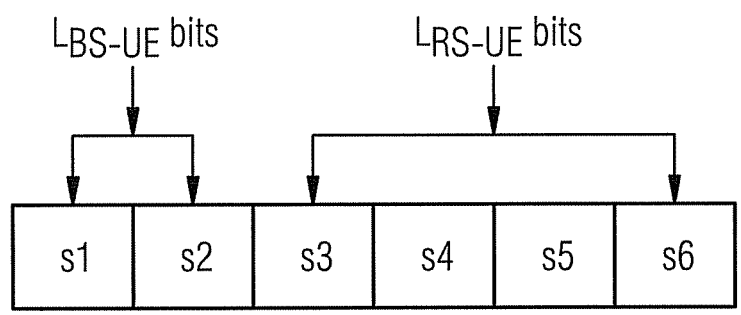
FIG. 3 is a data diagram of a method of simultaneously communicating data to the relay station and to the receiving station.

Constellation Multiplexing:

The method of simultaneously communicating $L_{BS-RS}$ bits to the relay station RS and $L_{BS-UE}$ to the receiving stations MS1, MS2 as per the CQI report is possible as shown in FIG. 3.

Hierarchical Encoding of Multiple Layers:

The constellation multiplexing technique is exploited to support multiple-layers of layered video coding by a hierarchical encoding method.

Figure 4:
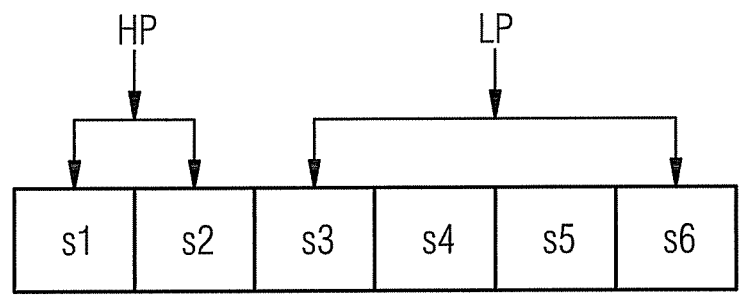
FIG. 4 is a data diagram of a method of hierarchical mapping.

An example of Hierarchical Encoding is shown in FIG. 4.

Layer 1—½ code: 150 information bits→300 coded bits→high priority layer HP

Layer 2—¾ code: 450 information bits→600 coded bits→low priority layer LP

An illustration combining the CQI-based constellation multiplexing and hierarchical encoding is provided as follows. The modulation table of QPSK (2 bits), 16-QAM (4 bits) and 64-QAM (6 bits) is considered as CQI feedback. $L_{BS-RS}$ and $L_{RS-UE}$ are assumed to be 6 bits.

Note that a consequence of Equation 1 is that it is efficient to transmit $L_{BS-UE}$ bits to UE as per the CQI report and allocate 6-$L_{BS-UE}$ bits to the relay station RS as in the table below.

| CQI report for $L_D$ | $L_{BS-UE}$ bits | $L_R$ bits | Hierarchical/Conventional |
|---|---|---|---|
| 0 | 0 | 6 | Conventional |
| 2 | 2 (HP) | 4 (LP) | Hierarchical |
| 4 | 4 (LP) | 2 (HP) | Hierarchical |
| 4 | 4 | 0 | Conventional |
| 6 | 6 | 0 | Conventional |

The base station BS signals the MCS type, whether it is hierarchical or conventional to the relay station RS and the receiving stations MS1 and MS2.

The base station BS also signals whether the second layer in hierarchical mode is intended for the receiving station MS1 or MS2, i.e. whether it is multicasting based on the buffer status. Note that if $L_D=4$ and high priority mode is not preferred for transmission to the receiving station MS1, MS2, then the signaling mechanism becomes somewhat implicit to the receiving station MS1, MS2. This is because hierarchical modulation is then employed only if the CQI report is 2 bits from receiving station MS1, MS2. However, the relay station RS is unaware about the CQI report from the receiving station MS1, MS2 to the base station BS. Therefore, the base station BS is required to signal about the transmission mode.

Persistent SDMA by Transmit Antenna Selection:

In what follows, a scheme of operation called 'Persistent SDMA' using a relay station RS is described.

The novelty in this mode of operation is in the use of base stations time slot during the relay transmission. In the prior schemes discussed, the base station BS transmits in orthogonal resources such as different time slots or frequency resource blocks during the transmission period of a relay station RS so as to avoid interference.

In persistent SDMA mode (space division multiple access), the base station BS transmits persistently in the same resource block during the relay transmission period. This scheme is suitable for applications where a constant traffic arrival rate is experienced at the base station BS with the relay stations RS not required to re-transmit substantial amount of data.

This mode of operation is enabled as follows.

1) Each user equipment under the relay cluster computes the MCS level supportable for combinations of transmit antennas, one antenna belonging to base station BS and one from relay station RS. The receiving station MS1, MS2 signals back the best combination and the MCS level supportable on each spatial stream for that best combination. MMSE filter (MMSE=minimum mean square error) and channel state information is used at the receivers of the receiving station MS1, MS2 for computation. This signaling is done both to base station BS and relay station RS. The user ids for transmission from base station BS and relay station RS in SDMA mode are selected by base station BS. Let the user IDs be m, n (note: the first and the second receiving stations MS1 and MS2 are referenced by their indices m and n instead by their reference signs MS1 and MS2 hereinafter) and the resource block j. For relevance with prior schemes, the user ID $n \in R$, where R is the group of users under the relay cluster pre-selected by the base station BS as per the transmit buffer queue size status at the base station BS.

2) In time slot i, the base station BS performs downlink SDMA transmission to the receiving stations m, n as in the schemes presented hereinbefore. The base station BS piggy backs data relating to user n in the relay cluster using hierarchical modulation scheme. The base station BS informs the relay station about the user ID n.

3) In time slot i+1, the base station BS was either idle or transmitted in orthogonal frequencies in prior schemes. However, in this scheme, feedback information from the receiving stations m, n as mentioned in step 1 is exploited. Here, the base station BS and relay station RS jointly transmit using the preferred antennas as requested by the receiving stations m and n in SDMA mode. The base station BS transmits single stream data for the receiving station m and the relay station RS transmits single stream data to the receiving station n. Note that receiving station m may or may not belong to relay cluster.

4) The receiving stations m and n use the MMSE detector to detect and then decode the data.

Interference Cancellation Schemes:

a) Persistent SDMA by Receive Antenna Selection:

The transmit mode in time slot i+1 is modified as follows for this scheme. In this scheme, full channel state information is used by the base station BS and the relay station RS regarding their channels to the pre-selected receiving stations m and n. The better of the receive antennas of the receiving stations m and n (antennas which receive more signal power) is used by both receiving stations m and n.

The relay station RS and the base station BS transmit on the null space of the 2×1 channels to receiving stations m and n. By doing so, the relay station RS avoids interference on the preferred receive antenna of the receiving station m. The base station BS avoids interference on the preferred receive antenna of receiving station n. In addition, the base station BS hierarchically encodes the transmit symbol in time slot i+1 for the receiving station m. This is enabled because of the following reason: The high priority layer HP is immediately decoded based on the signal estimate on the better of two receiving station antennas. This antenna receives interference free signal (or significantly less interference) from the relay station RS. To decode the low priority layer LP, an iterative decoding method is employed.

To do this, the receiver detects, decodes and reconstructs both the high priority and low priority bits from the received signal on its interference free receiver antenna. This is subtracted from the received signal on the second receiver antenna, which is a superposition of signals from the relay station RS and the base station BS. The interference symbols from the relay station RS are now detected, decoded and reconstructed. This estimated interference data is subtracted from the received symbols on the receiver antenna 2 to obtain a second estimate of signal from the base station BS.

The signals from two receiver antennas are MRC combined (MRC=Maximum Ratio Combining) to attempt a more accurate decoding of low priority bits. An intuitive advantage in making use of hierarchical modulation is that high priority layer HP or the base layer from the base station BS is decoded with minimal delay while the low priority layer LP is decoded in iteratively with more delay tolerance. Typically the low priority layer LP could come from stored information at the base station BS with a more tolerable packet time out deadline.

In the following example the IDs of the receiving stations m and n are identical, i.e. m=n. Here, additional coding gain can be exploited using concatenated coding at the base station BS for the low priority layer LP. The code transmitted from the bases station BS to the relay station RS in time slot i is one part of the code while the code transmitted by BS in time slot i+1 is the other part of the code. The relay station RS re-transmits the first part of the code in time slot i+1 which is received by the second receiver antenna at the receiving station. This technique improves the decoding accuracy of the low priority layer LP at the receiving station m.

b) Persistent SDMA by Base Station Nulling:

A limitation of the prior scheme is that the relay interference could be substantial for the receiving station m if the receiving station is under the relay cluster. This interference could be substantial even with precoding on null space because of channel outdating. In this case, the base station BS transmits such that it generates a null on one of the receiver antennas of the receiving station m in the time slot i+1. By doing so, it facilitates reception of the interference signal from the relay station RS. The interference signal is subtracted from the received signal on the second receiver antenna, thereby obtaining an estimate of signal from the base station BS in time slot i+1.

There is an additional latency involved because of decoding the signal from the relay station RS prior to decoding the signal from the base station BS in the time slot i+1. To avoid this latency issue, a fast detection of the signal from the relay station RS in time slot i+1 is employed. Because of the strong channel from the relay station RS, the interference signal is detected with high reliability. Interference cancellation is used to decode the high priority bits based on interference signal detection. To decode the low priority bits from the base station BS, the received signal from relay station RS is later fully decoded after detection. Interference cancellation is employed based on the decoded bits.

Dual Stream Transmission by Relay Station:

Dual stream transmission by relay station RS is a possibility if the channel from the base station BS to the relay cluster is generally much degraded and interference generated by the relay station RS is also degraded. In this case, the receiving station n receives the dual stream signal from the relay station RS, treating signal from the base station BS as interference in time slot i+1. The signal from the relay station RS is detected and decoded. A MMSE-IRC filter (MMSE=minimum mean square error; IRC=interference rejection combining) is used by the receiving station m. The estimated interference signal is subtracted from the received signal in time slot i+1 thereby giving an estimate of received signal from the base station BS.

Interference Cancellation by Relay Forwarding:

An adaptive single stream to dual stream mode switching mechanism is employed at the base station BS based on feedback from the receiving stations m, n in the following way. The novelty in this mechanism is that it allows a dual stream transmission from the relay station RS to more receiving stations m, n under its cluster.

The relay station RS either amplifies or re-generates the full transmit symbol received from the base station BS in time slot i. If the relay station RS were to selective re-map and forward the low priority bits, it discloses the modulation and coding format to both receiving stations m and n. The receiving station m then re-maps the decoded low priority data to this format.

The receiving stations m and n to be scheduled in time slot i+1 are pre-selected as in prior schemes. Both the receiving stations m and n belong to the relay cluster.

As before, the base station BS signals in SDMA mode (space division multiple access) in time slot i and piggy backs low priority layer LP needed for the receiving stations n in relay cluster. In addition, the base station BS informs the receiving stations m to receive and decode the data transmitted in time slot i to the relay station RS. The receiving station m is in the intended recipient of transmission from the base station BS in time slot i+1.

The receiving station m attempts to decode the data. If it succeeds, it informs the base station BS about its success. The base station BS then transmits in dual stream mode to the receiving station m in time slot i+1. The relay station RS transmits to the receiving station n in the time slot i+1 in dual stream mode.

The receiving station m subtracts the interference from the relay station RS using the successfully decoded packet, which was received in time slot i. If the packet was not successfully received in the time slot i, the receiving station m adopts two options as before in section 0.

a) It receives the signal from the relay station RS and the base station BS but treats the signal from the base station BS as interference noise in time slot i+1. The signal from the relay station RS is detected and decoded also making use of the previous received estimate of signal from time slot i. This provides additional receive diversity in the signal estimation. A MMSE-IRC filter is used by the receiving station m. The estimated interference signal is subtracted from the received signal in time slot i+1, thereby giving an estimate of received signal from the base station BS.

b) The signal from the base station BS could also be relatively strong at the receiving station m, i.e. the channel is not generally degraded. In that case, the receiving station m requests the base station BS to switch to single stream mode. The receiving station m then obtains an estimate of interference using the three independent receptions, one in time slot i+1 and two in time slot i. This interference data estimate is subtracted from the received signal in second receiver antenna. The signal estimate from the base station BS in time slot i is now obtained.

The system also includes permanent or removable storage, such as magnetic and optical discs, RAM, ROM, etc. on which the process and data structures of the present invention can be stored and distributed. The processes can also be distributed via, for example, downloading over a network such as the Internet. The system can output the results to a display device, printer, readily accessible memory or another computer on a network.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method of transmitting data in a radio network with at least one base station, at least one relay station and at least first and second receiving stations, in which the data is organized in at least a first and a second layer, comprising:
    routing at least the first layer via a first path from the at least one base station via the at least one relay station to the first receiving station;
    routing at least the second layer via a second path from the base station directly to the second receiving station;
    wherein the data being organized in at least a first and a second layer comprises apportioning bits of a constellation to the first path and the second path, wherein a number of bits of the constellation apportioned to the second path is based on a channel quality indicator (CQI) report and a remaining number of bits of the constellation are apportioned to the first path.

2. A method as claimed in claim 1, wherein the data are a video stream.

3. A method as claimed in claim 2, wherein a unicast report for a channel quality indicator with hierarchical modulation is used.

4. A method as claimed in claim 3, wherein the at least one base station signals to the at least one relay station and the at least first and second receiving stations via a control channel in which a time slot of a multitude of timeslots for a receiving station, among the at least first and second receiving stations, is scheduled.

5. A method as claimed in claim 4, wherein signaling information contains information about at least one receiving station, among the at least first and second receiving stations, scheduled on a hierarchically constellation multiplexed symbol per spatial multiplexing stream.

6. A method as claimed in claim 5, wherein signaling information additionally contains information about modulation and coding scheme format for a corresponding receiving station.

7. A method as claimed in claim 6, wherein the at least one base station and the at least one relay station transmit simultaneously to the at least one receiving station within a relay cluster.

8. A method as claimed in claim 7, further comprising jointly performing antenna selection in the at least one base station and the at least one relay station.

9. A method as claimed in claim 8, wherein the at least one base station and the at least one relay station use concatenated coding, iterative decoding or interference cancellation.

10. A method as claimed in claim 9, wherein data re-transmissions of the at least one relay station are used for interference mitigation with linear or non-linear operations.

11. A radio network designed to transmit data organized in at least a first and a second layer, comprising:
- at least one base station;
- at least one relay station; and
- at least first and second receiving stations, with at least the first layer routed via a first path from the at least one base station via the at least one relay station to the first receiving station and the second layer simultaneously routed via a second path from the base station to the second receiving station,
- wherein the data being organized in at least a first and a second layer comprises apportioning bits of a constellation to the first path and the second path, wherein a number of bits of the constellation apportioned to the second path is based on a channel quality indicator (CQI) report and a remaining number of bits of the constellation are apportioned to the first path.

12. A radio network as claimed in claim 11, wherein the radio network uses a unicast report for a channel quality indicator with hierarchical modulation.

13. A radio network as claimed in claim 12, wherein the at least one base station is designed to signal to the at least one relay station and the at least first and second receiving stations via a control channel in which a time slot of a multitude of timeslots for at least one receiving station, among the at least first and second receiving stations, is scheduled.

\* \* \* \* \*